(12) United States Patent
Thomas

(10) Patent No.: US 11,514,380 B2
(45) Date of Patent: Nov. 29, 2022

(54) CONTINUING INTERACTION WITH ONGOING TRANSACTIONS IN ERP SYSTEMS

(71) Applicant: Oracle International Corporation, Redwood Shores, CA (US)

(72) Inventor: Tony P Thomas, Changanacherry (IN)

(73) Assignee: Oracle International Corporation, Redwood Shores, CA (US)

(*) Notice: Subject to any disclaimer, the term of this patent is extended or adjusted under 35 U.S.C. 154(b) by 143 days.

(21) Appl. No.: 16/525,634

(22) Filed: Jul. 30, 2019

(65) Prior Publication Data
US 2021/0035040 A1  Feb. 4, 2021

(51) Int. Cl.
*G06Q 10/06* (2012.01)
*G06Q 40/00* (2012.01)
*G06Q 30/04* (2012.01)

(52) U.S. Cl.
CPC ... *G06Q 10/06313* (2013.01); *G06Q 10/0633* (2013.01); *G06Q 30/04* (2013.01); *G06Q 40/12* (2013.12)

(58) Field of Classification Search
CPC ... G06Q 10/06313; G06Q 40/12; G06Q 30/04
(Continued)

(56) References Cited

U.S. PATENT DOCUMENTS 6,574,605 B1 * 6/2003 Sanders ............... G06Q 30/04
 705/7.26
7,328,134 B1 * 2/2008 Burbidge, III ...... G06F 11/3414
 702/186

(Continued)

FOREIGN PATENT DOCUMENTS

CN  103646339 A  3/2014
WO  WO2000023874 A1  4/2000

OTHER PUBLICATIONS

Peiermoxon, How To Add Favorites To Your SAP Menu, http://www.saptraininghq.com/how-to-add-favorites-to-your-sap-menu/, dated Mar. 25, 2012, 9 pages.

(Continued)

*Primary Examiner* — Florian M Zeender
*Assistant Examiner* — Christopher R Buchanan
(74) *Attorney, Agent, or Firm* — IPHorizons PLLC; Narendra Reddy Thappeta

(57) ABSTRACT

An aspect of the present disclosure facilitates continuing interaction with ongoing transactions in ERP systems. In one embodiment, a system maintains a configuration data specifying transaction types of interest, and a respective set of actions and respective set of data fields associated with each transaction type. The system then monitors transactions performed in an ERP system to identify ongoing transactions of the transaction types. Upon receiving from a user, a request for ongoing transactions of interest, the system sends for display a list of ongoing transactions, a respective set of actions, a respective set of data fields and corresponding current values associated with each ongoing transaction. Upon receiving from the user, data indicating selection of an action associated with a specific ongoing transaction of the list, the system performs the selected action for the specific ongoing transaction in the ERP system.

18 Claims, 17 Drawing Sheets

(58) Field of Classification Search
USPC .................................................. 705/30, 7.12
See application file for complete search history.

(56) References Cited

U.S. PATENT DOCUMENTS

| | | | |
|---|---|---|---|
| 9,465,522 B2 | 10/2016 | Prasad et al. | |
| 9,704,110 B2* | 7/2017 | Shaw | G06Q 20/3278 |
| 2003/0061107 A1* | 3/2003 | Lee | G06Q 10/06 705/26.1 |
| 2007/0266151 A1 | 11/2007 | Friedland et al. | |
| 2012/0110579 A1* | 5/2012 | Bullen | G06Q 10/10 718/100 |
| 2012/0198547 A1 | 8/2012 | Fredette et al. | |
| 2013/0117444 A1* | 5/2013 | Sharma | H04L 67/16 709/224 |
| 2014/0081683 A1* | 3/2014 | Barak | G06Q 10/06 705/7.12 |
| 2017/0206532 A1* | 7/2017 | Choi | G06Q 30/02 |
| 2018/0075208 A1* | 3/2018 | Schmidt | G16H 50/30 |
| 2020/0265351 A1* | 8/2020 | Rohit | G06F 9/546 |

OTHER PUBLICATIONS

Favorites, SAP NetWeaver Business Client End User Guide, https://help.sap.com/saphelp_uiaddon10/helpdata/en/50/a643fb78d84bc69efd02c3ed6ae09a/frameset.htm, downloaded circa Apr. 11, 2019, 2 pages.

SAP Business Client, https://www2.le.ac.uk/offices/itservices/ithelp/services/sap/user-guides/get-started/SAP_Quick_Start_Guide.pdf, downloaded circa Apr. 11, 2019, 11 pages, University of Leicester.

Xun Liu, Usability Analysis of Working with SAP Applications in Volvo Group, http://www.diva-portal.org/smash/get/diva2:689215/FULLTEXT01.pdf, dated Jan. 2014, 41 pages, Uppsala university.

ERP System That is User Friendly: an Introduction to Usability in Sage ERP X3 Version 7, https://www.theanswerco.com/erp-system-that-is-user-friendly-an-introduction-to-usability-in-sage-erp-x3-version-7/, dated Jun. 3, 2014, 11 pages.

Landing Page in Sage X3, https://www.sagesoftware.co.in/blogs/landing-page-in-sage-x3/, dated Jul. 21, 2016, 4 pages.

The Ultimate Power of ERP, https://www.tuhund.com/, downloaded circa Apr. 11, 2019, 3 pages.

Employee Self-Service in Workday, https://www.cmu.edu/my-workday-toolkit/wbt/wbt-employee-self-service-overview.pdf, downloaded circa Apr. 12, 2019, 70 pages.

Learn How to Navigate the Salesforce Classic Console, https://help.salesforce.com/articleView?id=console2_using_intro_navigate.htm&type=5, downloaded circa Apr. 12, 2019, 2 pages.

* cited by examiner

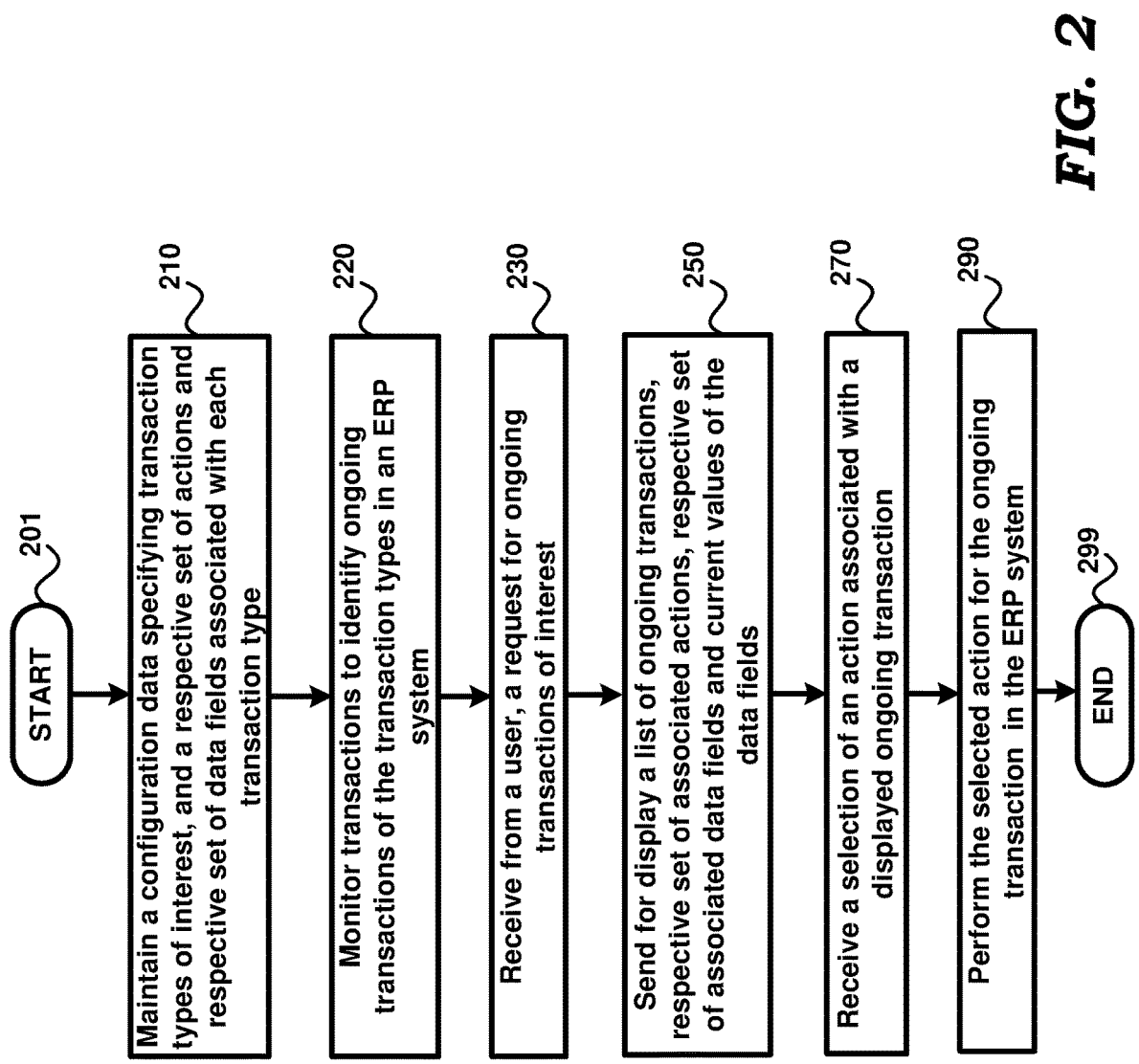

Purchase Order

Search Purchase Order
Enter any information you have and click search. Leave fields blank for a list of all values

| Find an Existing Value | Keyword Search | Add a New Value |

▼ Search Criteria

Business Unit  [=▼]  [US001] 🔍

PO ID  [begins with ▼]  [SUMMARYPO] ✕  ⎫
Purchase Order Date  [=▼]  [    ] [31]   ⎬ 365
PO Status  [=▼]  [         ▼]  ⎭
Short Supplier Name  [begins with ▼]  [         ] 🔍
Supplier ID  [begins with ▼]  [         ] 🔍
Supplier name  [begins with ▼]  [         ] 🔍
Buyer  [begins with ▼]  [         ] 🔍
Buyer Name  [begins with ▼]  [         ] 🔍
PO Type  [=▼]  [         ▼]
Purchase Order Reference  [begins with ▼]  [         ]

☐ Hold for Further Processing
☐ Case Sensitive

[Search]  [Clear]    Basic Search 🔍  Save Search Criteria

*FIG. 3E*

Purchase Order

Update Purchase Order
Save for Later | Summary and Submit

Purchase Order

Business Unit US001
PO ID SUMMARYPO
Copy From [ ▾ ]

▶ Header

| | | | | |
|---|---|---|---|---|
| *PO Date | 02/17/2012 | [⌕] Supplier Search | PO Status Dispatched — 375 | |
| *Supplier | EB.TRAVEL-001 | Supplier Details | Budget Status Valid | |
| | East Bay Travel | | ☐ Hold From Further Processing | |
| *Supplier ID | USA0000002 | | Doc Tol Status Valid | [Backorder PO] |
| *Buyer | POS4 | | Backorder Status Not Backgrounded | Create BackOrder |
| | Hosking, Andrew | | Receipt Status Not Received | |
| PO Reference | | | *Dispatch Method [Print ▾] | [Dispatch] |

Header Details    Activity Summary
PO Defaults    Add Comments
PO Activities    Add Ship to Comments
Requisitions    Documents Status
*Actions    Procurement Group

Account Summary
Merchandise    100.00
Freight/Tax/Misc.    0.00
Total Amount    100.00 USD
Encumbrance Balance    Not Available USD    [Calculate]

Add Item From
Catalog    Item Search
Purchasing Kit

Select Lines To Display
Search for Lines   Line [ 🔍 ] To [ ] 🔍 [Retrieve]

↑ 390

Lines — 380

| Details | Ship To/Due Date | Statuses | Item Information | Attributes | RFQ | Contract | Receiving |
|---|---|---|---|---|---|---|---|
| Line | Item | Description | | PO Qty | *UOM | Category | Price | Merchandise Amount |

*FIG. 3F*

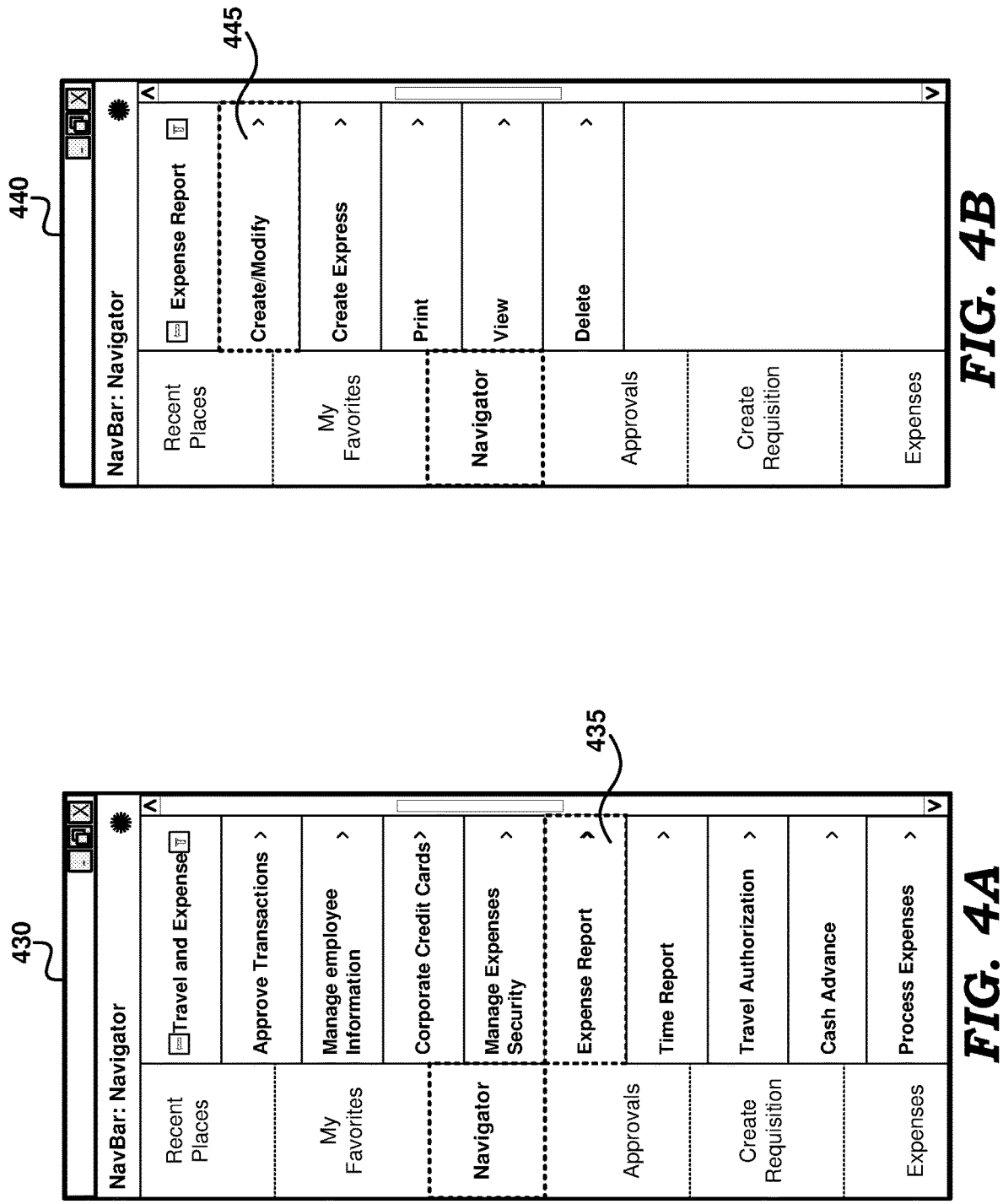

Expense Report

Search Expense Report
Enter any information you have and click search. Leave fields blank for a list of all values

| Find an Existing Value | Keyword Search | Add a New Value |

▼ Search Criteria

Report ID [begins with ∨] [%0000144] ← 465
Report Description [begins with ∨] [        ] x
Name [begins with ∨] [        ]
Empl ID [begins with ∨] [        ] ⚷
Report Status [= ∨]
Creation Date [= ∨] [   ] 📅

☐ Case Sensitive

[ Search ] [ Clear ]   Basic Search 🔍  Save Search Criteria

Expense Report

Modify Expense Report

Kenneth Schumacher

Save for Later | Summary and Submit

Actions [....Choose an Action ▾] [GO]

*Business Purpose [General Travel and Expense ▾]

*Report Description [Consulting and product demo ✕]

Report 0000000144 [Pending] —475

Reference [    ] ⚷

Default Location [    ] ⚷

Attachments

Expenses

Expand All | Collapse All    Add: | My Wallet (10) | Quick-Fill                Total    10.00    USD

| *Date | Expense Type | Description | *Payment Type | *Amount | *Currency |
|---|---|---|---|---|---|
| 06/01/2019 [31] | Mobile Phone ▾ | bb<br>252 characters remaining | Check ▾ | 10.00 | USD ▾ |

⚷  [+] [-]  —480

Total    10.00    USD

Expand All | Collapse All

Transaction Type Definition

Transaction Type: Expense          Status: Active
Component Name: EX_SHEET_FL        User List: All

Data Insights Fields

| Field Name | Label        | Order | Add | Del |
|------------|--------------|-------|-----|-----|
| STATUS     | Status       | 1     | +   | -   |
| AMOUNT     | Total Amount | 2     | +   | -   |

Action List

| Action | Add | Del |
|--------|-----|-----|
| Submit | +   | -   |

Configure Actions

Action: EX_SBMT_1                        Status: Active

Action Name : Submit

Application Class: [ EX_SHEET_FL: Submit Action  🔍 ]

730

Personalize Transactions of Your Interest

Personalize Transactions of Your Interest

| Transaction Type | Maximum Limit | Enable |
|---|---|---|
| Expense | 5 | Yes |
| Purchase Order | 4 | Yes |
| Requisition | 3 | No |
| Contracts | 4 | Yes |

Configure Expense

| Filed | Show Label | Order | Enable |
|---|---|---|---|
| Status | Yes | 1 | Yes |
| Amount | Yes | 2 | No |

Δ Configure Purchase Order

Δ Configure Requisition

Δ Configure Contracts

CONTINUING INTERACTION WITH ONGOING TRANSACTIONS IN ERP SYSTEMS

BACKGROUND OF THE DISCLOSURE

Technical Field

The present disclosure relates to enterprise resource planning (ERP) systems, and more specifically to continuing interaction with ongoing transactions in ERP systems.

Related Art

Enterprise resource planning (ERP) systems are often used for management of business processes in organizations, as is well known in the relevant arts. ERP systems are available from various vendors such as Oracle Corporation, SAP, Microsoft, IBM, etc., as is also well known in the relevant arts.

Transactions are the basis for obtaining various functionalities in ERP systems. Each transaction typically contains a series of actions that are to be performed by one or more users for obtaining the corresponding functionality of the ERP system. Examples of transactions in an ERP system includes purchase order (PO), expense report, contract, etc.

A transaction is said to be ongoing when a user has performed only a sub-set of a series of actions corresponding to the transaction. In other words, there is another sub-set of the series of action that are to be performed for that transaction to be deemed to be completed. For example, in an expense report transaction, a user may continue to enter incurred expenses over several days, and the transaction accordingly is deemed to be ongoing in that duration.

Challenges may be presented for a user to access an ongoing transaction, for example, as the user may have several ongoing transactions for the same or unrelated functionalities. The challenges may be compounded by the fact that ERP systems often have several thousands of transactions and a user may have to navigate several screens to even access a desired transaction.

Aspects of the present disclosure relate to continuing interaction with ongoing transactions in ERP systems.

BRIEF DESCRIPTION OF THE DRAWINGS

Example embodiments of the present disclosure will be described with reference to the accompanying drawings briefly described below.

FIG. 2 is a flow chart illustrating the manner in which continuing interaction with ongoing transactions in ERP systems is facilitated according to an aspect of the present disclosure.

FIGS. 3A-3F depicts sample user interfaces that a user navigates in an ERP system to initiate a transaction of a transaction type (purchase order) in one embodiment.

FIGS. 4A-4D depicts sample user interfaces that a user navigates in an ERP system to initiate a transaction of another transaction type (expense report) in one embodiment.

FIGS. 7A-7C depicts sample user interfaces that facilitate a user to specify configuration data in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

According to an aspect of the present disclosure, a list of ongoing transactions in an ERP system and a respective set of actions associated with each ongoing transaction is sent for display. In response to receiving from a user, data indicating selection of an action associated with a specific ongoing transaction of the list, the selected action is performed for the specific ongoing transaction in the ERP system. Thus, a user is facilitated to perform the selected action without the user having to navigate to the screen corresponding to the specific ongoing transaction.

According to another aspect of the present disclosure, in response to receiving a request for ongoing transactions of interest to a user in an ERP system, a list of ongoing transactions, a respective set of data fields and corresponding current values associated with each ongoing transaction are determined. The list of ongoing transactions, the respective set of data fields and corresponding current values are then sent for display. Thus, a user is enabled to view the current value of a specific data field associated with an ongoing transaction without having to navigate to a screen corresponding to the ongoing transaction.

According to one more aspect of the present disclosure, a configuration data specifying a set of transaction types of interest to a user is maintained. As such, the list of ongoing transactions includes only those ongoing transactions of the set of transaction types initiated by the user.

According to yet another aspect of the present disclosure, the configuration data (noted above) also specifies a corresponding set of actions and a corresponding set of data fields associated with each transaction type of the transaction type. The respective set of actions and the respective set of data fields sent for display are based on the corresponding actions and data fields specified in the configuration data. In one embodiment, the current values of the respective set of data fields at a first time instance (at which the request for the list of ongoing transactions is received) are sent for display.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
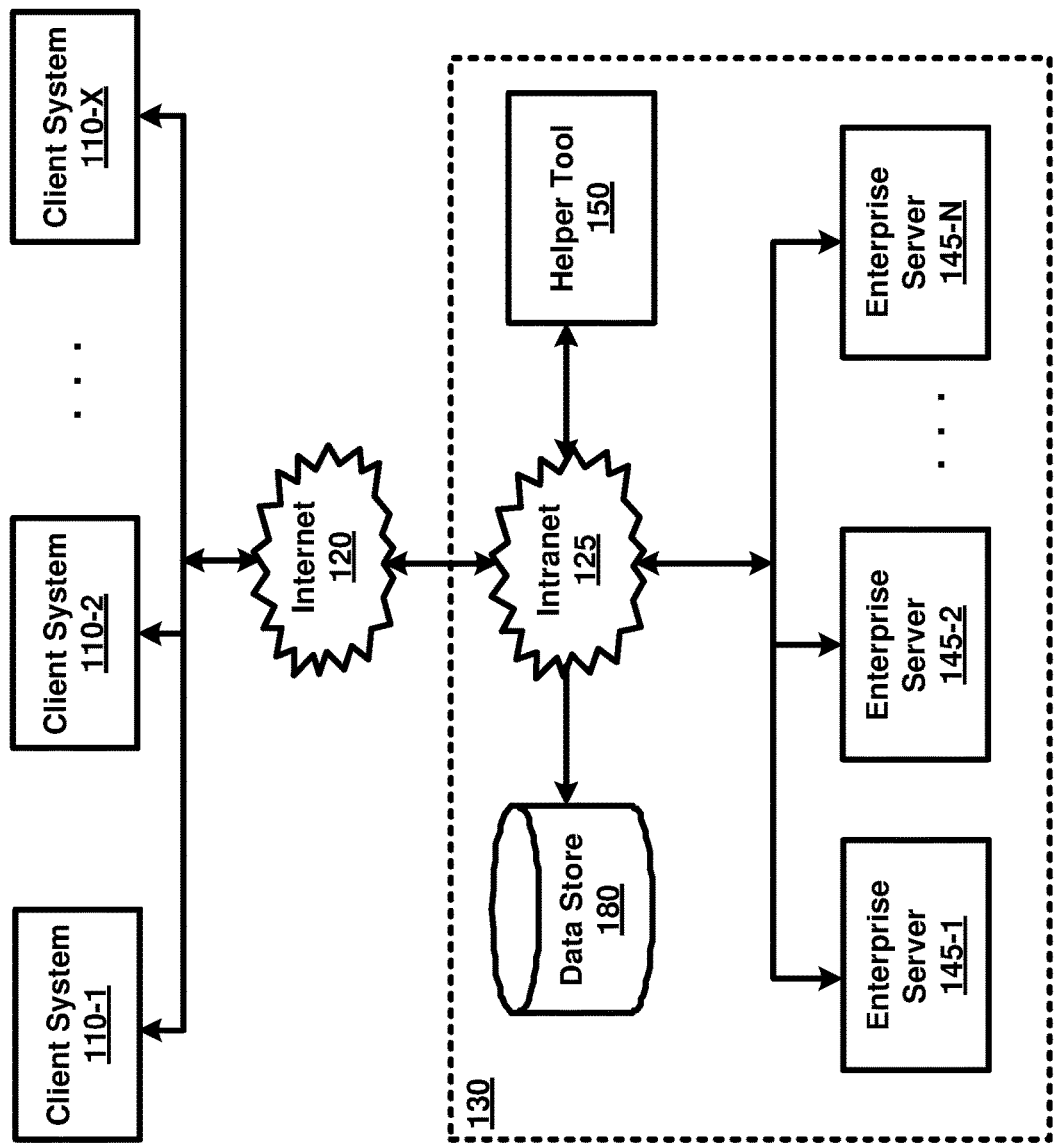
FIG. 1 is a block diagram illustrating an example environment (computing system) in which several aspects of the present invention can be implemented.

FIG. 1 is a block diagram illustrating an example computing system in which several aspects of the present disclosure can be implemented. The block diagram is shown containing client systems 110-1 through 110-X, Internet 120 and enterprise computing environment 130. Enterprise computing environment 130 in turn is shown containing intranet 125, enterprise servers 145-1 to 145-N, helper tool 150 and data store 180.

Client systems 110-1 to 110-X are collectively or individually referred by referral numeral 110, as will be clear from the context. Similar convention is adapted with respect to enterprise servers 145-1 through 145-N also, wherein X and N represent any arbitrary positive numbers as suitable in the corresponding environments.

Merely for illustration, only representative number/type of blocks is shown in FIG. 1. Many environments often contain many more blocks, both in number and type, depending on the purpose for which the environment is designed. For example, a typical enterprise contains many enterprise servers/data stores and many applications may be running on the enterprise servers. Each block of FIG. 1 is described below in further detail.

Internet 120 represents a data network providing connectivity between client systems 110-1 to 110-X and various systems present in enterprise computing system 130. Internet 120 may encompass the world-wide connected Internet. Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is to be directed to a target system when the destination IP address of the packet is set to the IP address of the target system, such that the packet is eventually delivered to the target system by internet 120. When the packet contains content such as port numbers, which specifies a target application, the packet may be directed to such application as well.

Intranet 125 provides connectivity between various systems/servers of enterprise computing system 130, while also extending the connectivity to various other devices accessible via internet 120. Intranet 125 may be implemented as local area networks (e.g., using wireless and wire-based technologies) supporting TCP/IP protocols.

Each of client systems 110-1 to 110-X represents a system such as a personal computer, workstation, mobile device, computing tablet etc., used by end users to generate (user) requests directed to the various application s executing in enterprise computing system 130. The requests may be generated using appropriate user interfaces (e.g., web pages provided by an application executing in enterprise server 145, a native user interface provided by a portion of an application downloaded from the server, etc.). In general, client system 110 sends a user request containing one or more tasks and may receive the corresponding responses (e.g., embedded in web pages) containing the results of execution of the tasks. The web pages/responses may then be presented to the user at client systems 110-1 to 110-X by client applications such as the browser.

Data store 180 represents a non-volatile (persistent) storage and provides for storage and retrieval of data by applications executing in enterprise server 145. Data store 180 may be implemented as a corresponding database server using relational database technologies and accordingly provide storage and retrieval of data using structured queries such as SQL (Structured Query Language). Alternatively (or in addition), data store 180 may be implemented as a corresponding file server providing storage and retrieval of data in the form of files organized as one or more directories, as is well known in the relevant arts.

Each of enterprise servers 145-1 to 145-N represents a server, such as a web/application server, executing one or more software applications. Some of the applications may correspond to different instances of the same software application for purposes such as scale and security. However, many different software applications may be executed in enterprise server 130 as corresponding instances. Each instance of the software application is conveniently referred to as a software application, unless the context specifies otherwise.

An enterprise server receives a user request from a client system 110 and performs the tasks requested (in the user request). The enterprise server may use data stored internally (for example, in a non-volatile storage/hard disk within the server), external data (e.g., maintained in a data store) and/or data received from external sources (e.g., from the user) in performing the requested tasks. The enterprise server then sends the result of performance of the tasks to the requesting client system (one of 110) as a corresponding response to the user request. The results may be accompanied by specific user interfaces (e.g., web pages) for displaying the results to the requesting user.

In one embodiment, enterprise servers 145 and data store 180 together implement an Enterprise Resource Planning (ERP) system. Users using client system 110 access the various functionalities provided by the ERP system. The users typically perform a series of actions (referred to as a transaction) for obtaining the corresponding functionality of the ERP system. Examples of transactions in an ERP system includes but are not limited to purchase order (PO), expense report, contract, etc.

It may be appreciated that a user may have several ongoing transactions for the same or unrelated functionalities. In addition, the ERP system often has several thousands of ongoing transactions and the user may have to navigate several screens (provided by one or more applications) to even access a desired transaction.

Helper tool 150, provided according to several aspects of the present disclosure, facilitates continuation of interaction with ongoing transactions in the ERP system as described below with examples. Though shown as a separate block/system, it may be appreciated that helper tool 150 may be implemented as part of ERP system (e.g., as an application in enterprise server 145).

3. Continuing Interaction with Ongoing Transactions

FIG. 2 is a flow chart illustrating the manner in which continuing interaction with ongoing transactions in ERP systems is facilitated according to an aspect of the present disclosure. The flowchart is described with respect to the systems of FIG. 1, in particular helper tool 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, helper tool 150 maintains a configuration data specifying transaction types of interest and a respective set of actions and respective set of data fields associated with each transaction type. A transaction type represents a discrete functionality of the ERP system that is accessible to users. Examples of transaction types are "Purchase Order", "Expense Report", etc. The configuration data may be maintained in data store 180. In one embodiment described in the below sections, the configuration data also specifies a list of users to which the configuration is applicable.

In step 220, helper tool 150 monitors transactions to identify ongoing transactions of the transaction types performed in an ERP system (such as the ERP system of FIG. 1 noted above). A transaction represents an instance of a transaction type and typically contains a series of actions that are to be performed by one or more users for obtaining or realizing the corresponding functionality of the ERP system. When only a sub-set of the series of actions of a transaction is performed, the transaction is deemed to be "ongoing".

The monitoring for ongoing transactions in the ERP system may be performed in any convenient manner. For example, helper tool 150 may monitor the user requests sent by each user (using client system 110) to identify the list of ongoing transactions for the user. In one embodiment, helper tool 150 includes in the list for a user, the transactions of the transaction types specified in the configuration data that are initiated by the user.

In step 230, helper tool 150 receives from a user, a request for ongoing transactions of interest. The request may be received from one of client systems 110. In one embodiment described in the below sections, the request is received upon the user navigating to a home screen of the ERP system after authenticating himself/herself with the ERP system using a login screen.

In step 250, helper tool 150 sends for display a list of ongoing transactions, respective set of associated actions, respective set of associated data fields and current values of the data fields. The list, associated actions/data fields and corresponding current values may be sent to a client system (e.g. 110D) from which the request of step 230 was received, and accordingly the list and associated information may be displayed as part of a user interface on a display unit (not shown) associated with the requesting client system (110D).

In step 270, helper tool 150 receives a (data indicating) selection of an action associated with a displayed ongoing transaction. The selection may be received in response to the user clicking/selecting any desired action in the user interface displayed to the user (on the requesting client system 110D).

In step 290, helper tool 150 performs the selected action for the ongoing transaction in the ERP system. The performance of the selected action may be done in any convenient manner For example, helper tool 150 may send a transaction request indicating the details of the ongoing transaction and the selected action to ERP system (specifically, one of the software applications executing in enterprise server 145), with the ERP system then performing the selected action for the first ongoing transaction as a response to the transaction request. The flowchart ends in step 299.

It should be appreciated that the display of the current values of the data fields facilitates the user to track the status of the ongoing transactions initiated by the user. In addition, the user is enabled to perform a desired action for an ongoing transaction without the user having to navigate to the screen corresponding to the ongoing transaction in the ERP system.

The manner in which helper tool 150 facilitates a user to continue interaction with ongoing transactions in an enterprise resource planning (ERP) system according to the steps of FIG. 2 is described below with examples. Specifically, the manner in which a user initiates transactions of various transaction types is first described followed by the manner in which the user is facilitated to continue interaction with such ongoing transactions.

4. Initiating Transactions

FIGS. 3A-3F depicts sample user interfaces that a user navigates in an ERP system to initiate a transaction of a transaction type (purchase order) in one embodiment. The various display areas shown in FIGS. 3A-3F (and also in FIGS. 4A-4D, 5A-5B) represent a portion of a user interface displayed on a display unit (not shown) associated with one of client system 110. The user interface may be provided by ERP system, for example, by a software application executing in enterprise service 145. In one embodiment, each user interface corresponds to a web page provided by enterprise server 145 and rendered by a browser executing on client system 110.

Figure 3A:
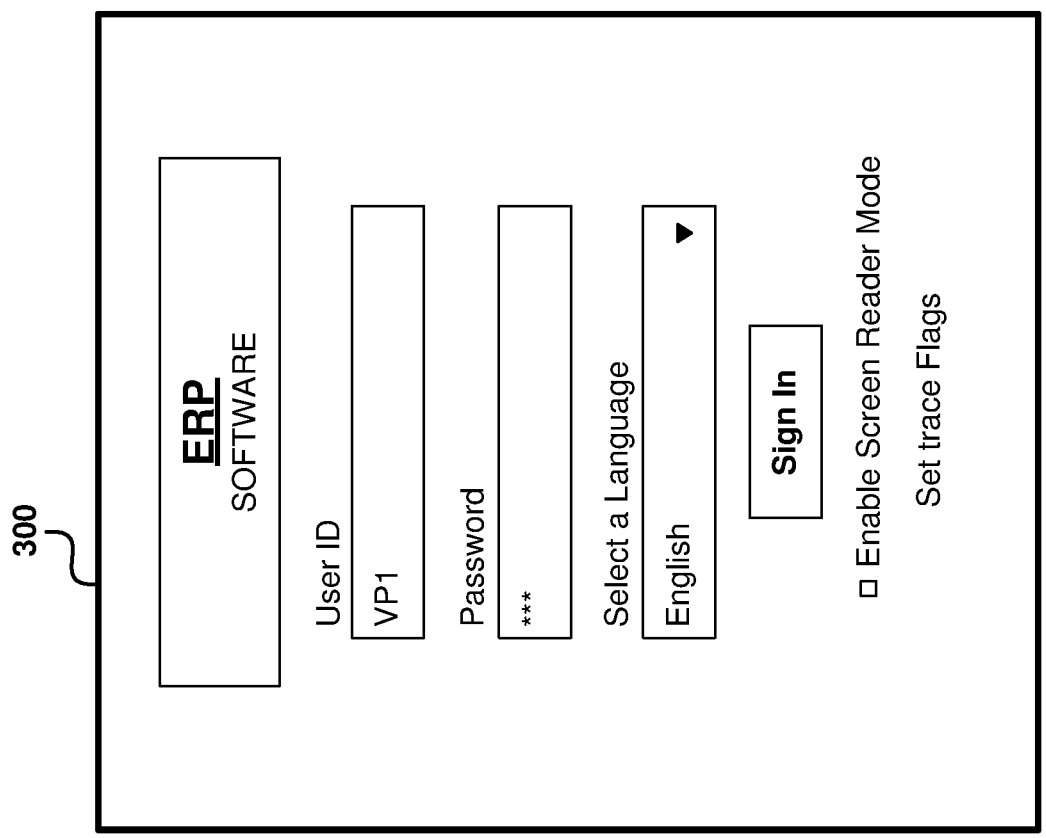
Figure 3B:
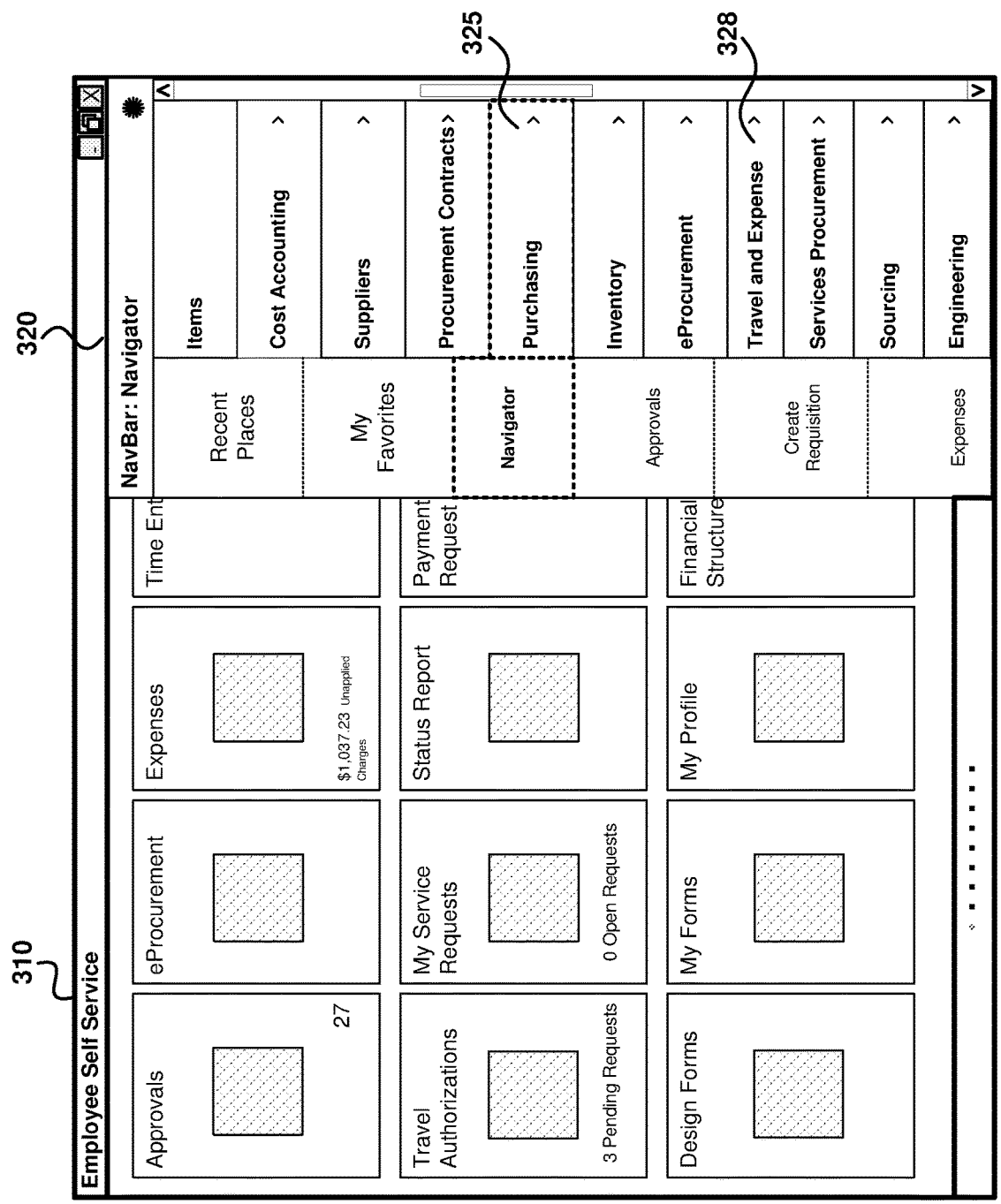

Display area 300 of FIG. 3A depicts a login screen using which users are facilitated to gain access to the ERP system by identifying and authenticating themselves (using the User ID and Password shown there). Display area 310 of FIG. 3B depicts a home screen (entitled "Employee Self Service") that is displayed after a user authenticates himself/herself using the login screen of FIG. 3A. In one embodiment, "Employee Self Service" is an example home screen, with different home screen(s) being displayed to different users based on their role.

In general, the home screen facilitates an authenticated user to access various functionalities of the ERP system. For example, the user may use the navigation bar shown in display area 320 to view a list of functionalities available in ERP system. The description is continued assuming that a user has selected option 325 (the functionality "Purchasing") in navigation bar 320.

Figures 3C, 3D:
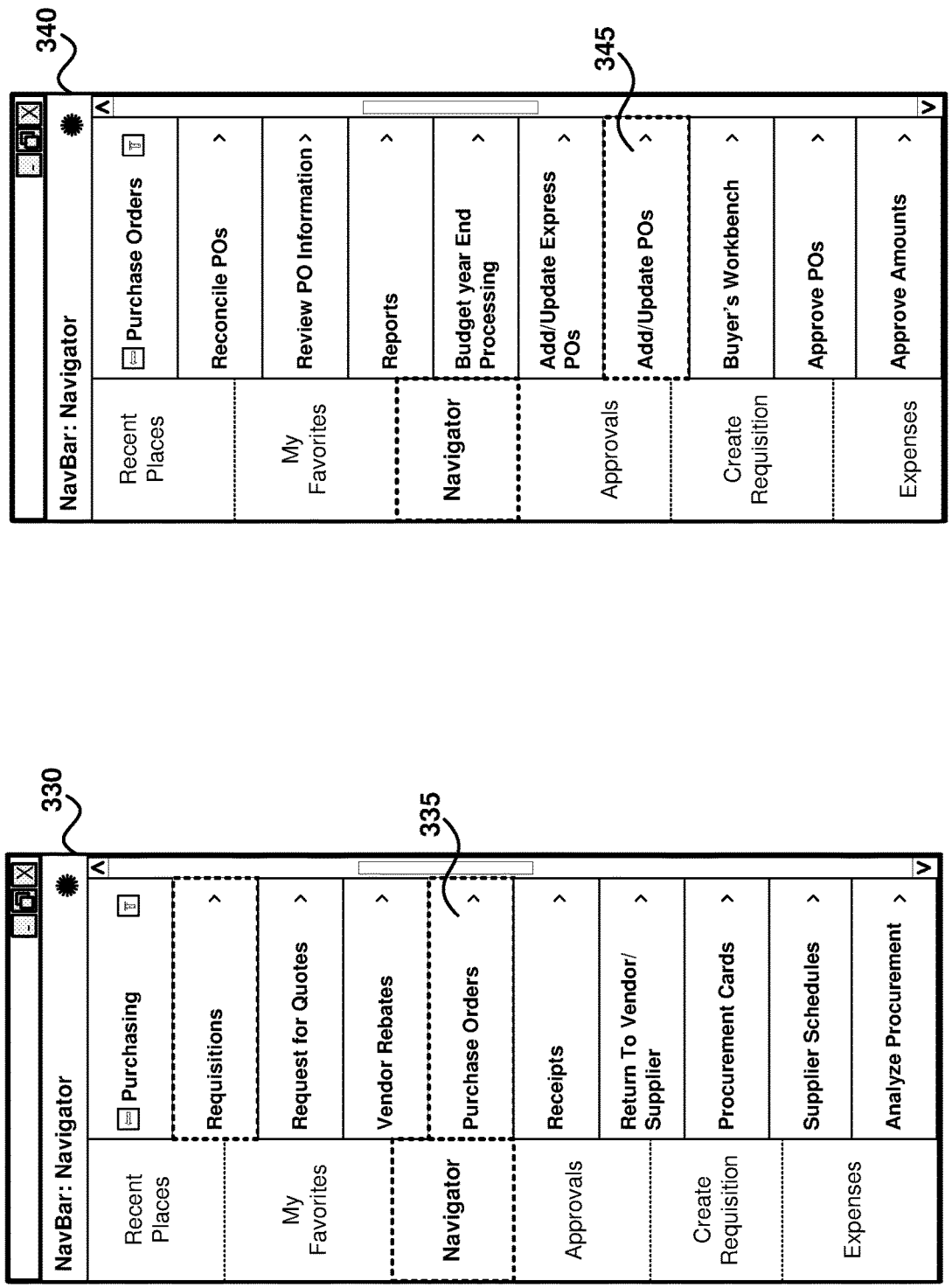

Display area 330 of FIG. 3C depicts various options (sub-functionalities) available under "Purchasing", and may be displayed in response to the user selecting option 325 in display area 320. Specifically, the options/sub-functionalities in display area 330 correspond to various transaction types available under "Purchasing". The description is continued assuming that the user has selected option 335 (the transaction type "Purchase Order") in navigation bar 330.

Display area 340 of FIG. 3D depicts various options (sub-functionalities) available under the transaction type "Purchase Order", and may be displayed in response to the user selecting option 335 in display area 330. Specifically, the options/sub-functionalities in display area 340 correspond to various transaction activities available under "Purchase Order". The description is continued assuming that the user has selected option 345 (the transaction activity "Add/Update PO") in navigation bar 340.

Display area 360 of FIG. 3E depicts a "Search Purchase Order" screen that facilitates a user to search for an existing purchase order or create a new purchase order. For example, the user may search for the existing purchase order by specifying portion of the identifier of the PO in display area 365. A user may also select the tab "Add a New Value" to create a new purchase order. Display area 360 may be displayed in response to a user selecting option 345 ("Add/Update PO") in navigation bar 340.

Display area 370 of FIG. 3F depicts a "Update Purchase Order" screen that facilitates a user to update an existing purchase order (a transaction instance of the transaction type "Purchase Order"). For example, the user may add details such as "PO Date", "Supplier", etc. in the data fields shown in display area 370. Display area 380 facilitates the user to add one or more PO lines, with each PO line corresponding to an item sought to be purchased, while display area 390 depicts various actions available associated with the purchase order transaction. Display area 370 may be displayed in response to a user searching for the purchase order using the search screen of display area 360.

Thus, a user, to initiate a transaction of the transaction type "Purchase Order", authenticates himself/herself using login screen of FIG. 3A, uses the navigation bar as shown in FIGS. 3B to 3D to access the "Search Purchase Order" screen of FIG. 3E, searches for a desired purchase order to access the "Update Purchase Order" screen of FIG. 3F and then modifies the desired purchase order. It may be appreciated that the user may be required to perform the above navigation even to view the values of various data fields such as "Status" data field 375 of FIG. 3F.

It may be further appreciated that the user after creating or modifying a purchase order using the "Update Purchase Order" screen, may wish to modify the purchase order at a later/future time instance. For example, the user may wish to add/modify/delete one or more PO lines to the purchase order at the later time. Accordingly, the user may select "Save for Later" action shown in display area 390 to indicate to the ERP system that the specific purchase order transaction is an ongoing transaction and is not complete. Alternatively, the user may select "Summary and Submit" action in display area 390 to indicate to the ERP system that the action is completed.

The description is continued illustrating the manner in which a user is facilitated to initiate a transaction of another transaction type.

FIGS. 4A-4D depicts sample user interfaces that a user navigates in an ERP system to initiate a transaction of another transaction type (expense report) in one embodiment. It is assumed that a user has authenticated himself/herself using login screen of FIG. 3A and is currently viewing the "Employee Self Service" (home) screen of FIG. 3B, and accordingly the display areas of FIGS. 3A/3B are not repeated here for conciseness.

Display area 430 of FIG. 4A depicts various options (sub-functionalities) available under "Travel and Expense", and may be displayed in response to the user selecting option 328 in display area 320. Specifically, the options/sub-functionalities in display area 430 correspond to various transaction types available under "Travel and Expense". The description is continued assuming that the user has selected option 435 (the transaction type "Expense Report") in navigation bar 430.

Display area 440 of FIG. 4D depicts various options (sub-functionalities) available under the transaction type "Expense Report", and may be displayed in response to the user selecting option 435 in display area 430. Specifically, the options/sub-functionalities in display area 440 correspond to various transaction activities available under "Expense Report". The description is continued assuming that the user has selected option 445 (the transaction activity "Create/Modify") in navigation bar 440.

Display area 460 of FIG. 4C depicts a "Search Expense Report" screen that facilitates a user to search for an existing expense report (for example, by specifying a portion of the identifier of the report in display area 465) or to create new expense report (by selecting tab "Add a New Value"). Display area 460 may be displayed in response to a user selecting option 445 ("Create/Modify") in navigation bar 440.

Display area 470 of FIG. 4D depicts a "Modify Expense Report" screen that facilitates a user to update an existing expense report (a transaction instance of the transaction type "Expense Report"). Display area 480 facilitates the user to add one or more lines/expense items, while display area 490 depicts various actions available associated with the expense transaction. Display area 470 may be displayed in response to a user searching for the expense report using the search screen of display area 460.

Thus, a user, to initiate a transaction of the transaction type "Expense Order", authenticates himself/herself using login screen of FIG. 3A, uses the navigation bar as shown in FIGS. 3B and 4A-4B to access the "Search Expense Report" screen of FIG. 4C, searches for a desired expense report to access the "Modify Expense Report" screen of FIG. 4D and then modifies the desired expense report. It may be appreciated that the user may be required to perform the above navigation even to view the values of various data fields such as "Status" data field 475 of FIG. 4D.

Similar to above, a user after creating or modifying an expense report using the "Modify Expense Report" screen, may wish to modify the expense report (e.g. add/modify/delete one or more lines/expense items) at a later/future time instance. Accordingly, the user may select "Save for Later" action (instead of the "Summary and Submit" action) shown in display area 490 to indicate to the ERP system that the specific expense transaction is an ongoing transaction and is not complete.

Thus, a user is facilitated to initiate transactions of different transaction types (here, Purchase Order and Expense Report) in an ERP system. In a prior approach, the user may have to navigate similar sequence of screens (3A-3F, 3A-3B and 4A-4D) to continue interaction with the ongoing transactions (purchase order and expense report). The manner in which the user is facilitated to continue interaction with such ongoing transactions, according to aspects of the present disclosure, is described below with examples.

5. Continuing Interaction with Ongoing Transactions

Figure 5A:
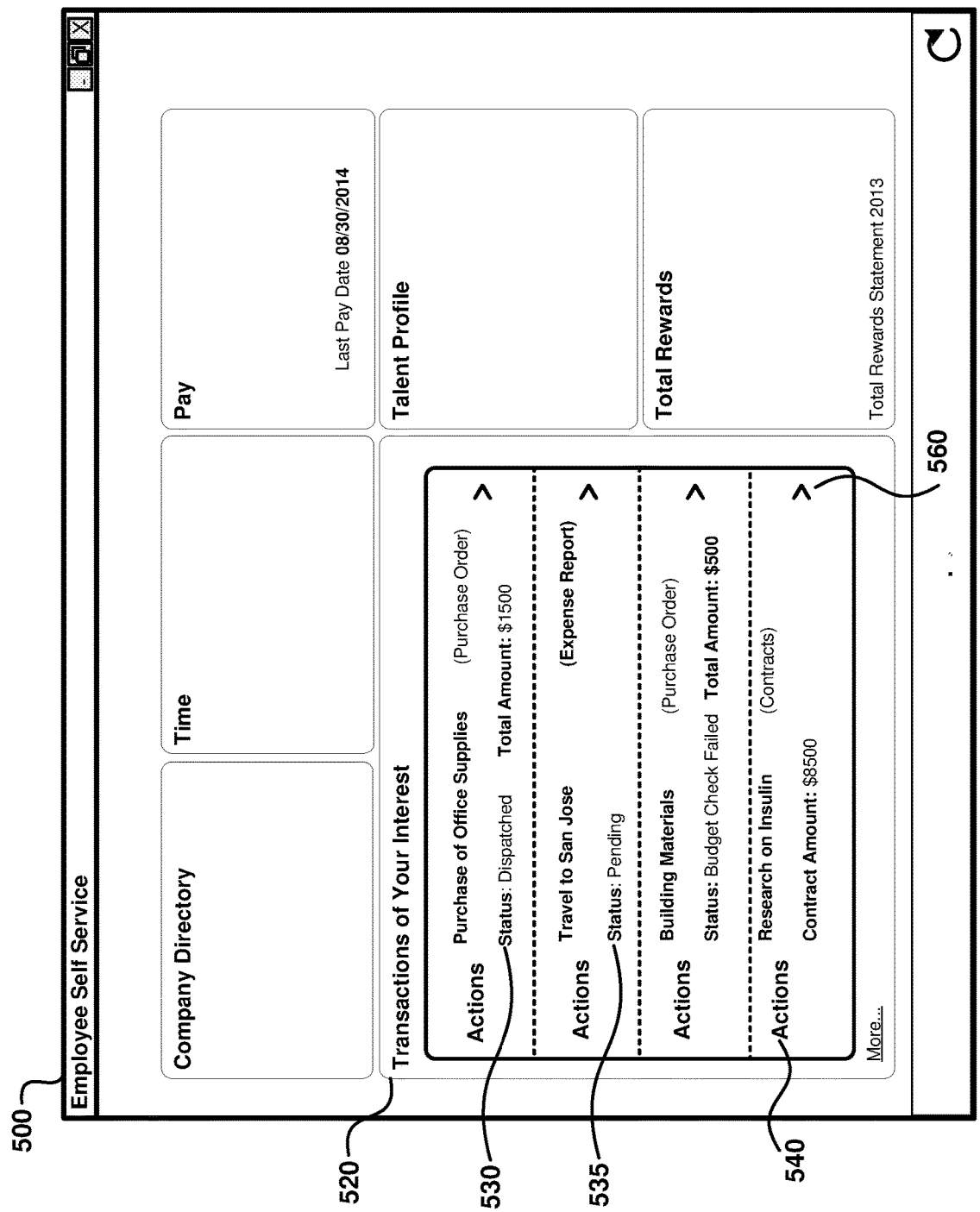
FIGS. 5A and 5B depict sample user interfaces that facilitate continuing interaction with ongoing transactions in an ERP system in one embodiment.
Figure 5B:
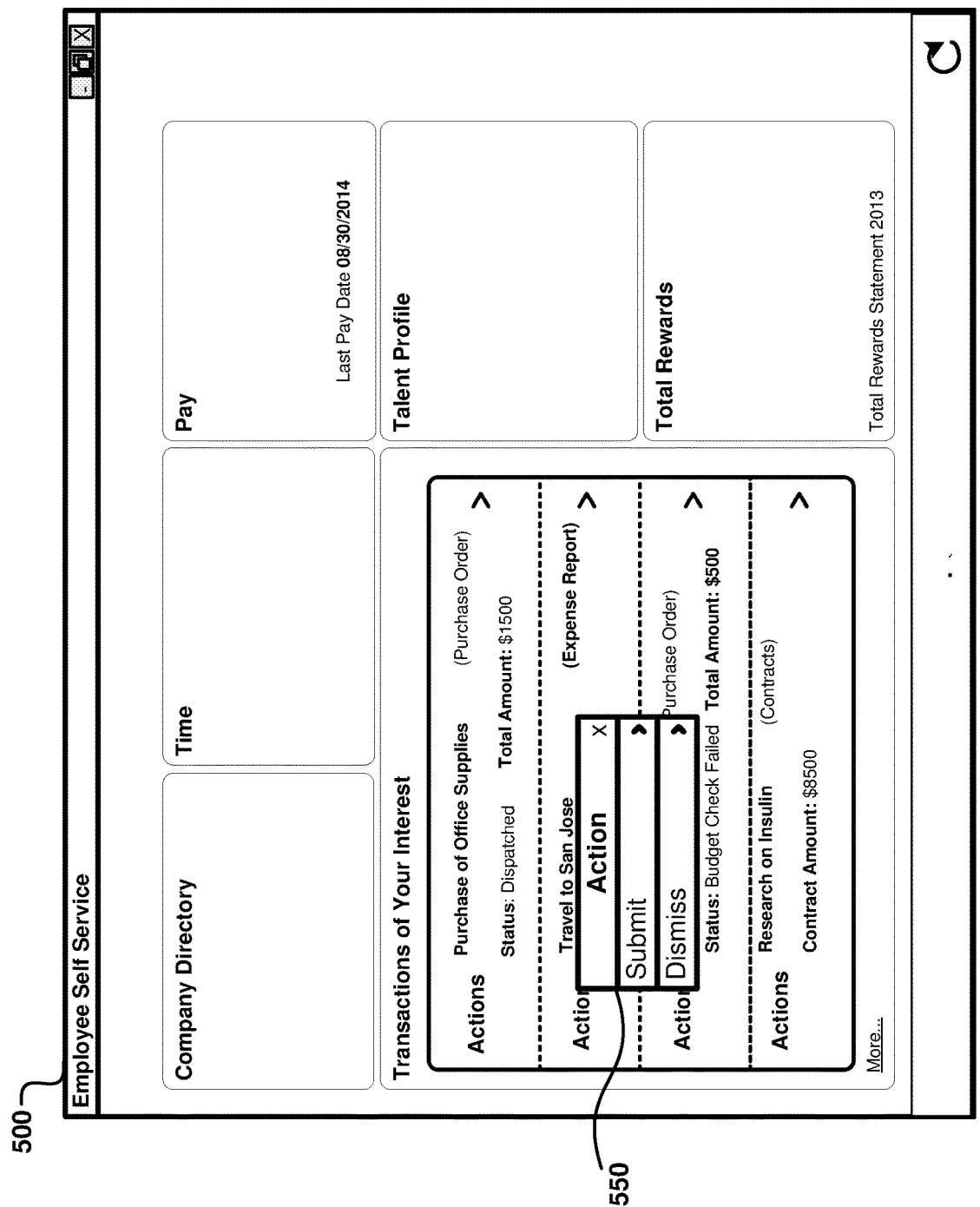

FIGS. 5A and 5B depict sample user interfaces that facilitate continuing interaction with ongoing transactions in an ERP system in one embodiment. Display area 500 of FIG. 5A depicts a home screen (entitled "Employee Self Service") that is displayed after a user authenticates himself/herself using the login screen of FIG. 3A. As noted above, in some embodiments, different users may be provided different home screen(s) based on their role. An aspect of the present disclosure is to display the transactions of user interest (display area 520 noted below) in the default home screen of each user regardless of their role.

Display area 520 (entitled "Transactions of User Interest"), provided according to several aspects of the present disclosure, displays a list of ongoing transactions of interest to the authenticated user. It should be noted that while the user interface of display area 500 is provided by the ERP system, the information shown in display area 520 is provided by helper tool 150.

Specifically, display area 520 is shown displaying four ongoing transactions (of different transaction types) of interest to the user. Each ongoing transaction is shown displayed with a title (e.g., "Purchase of Office Supplies") along with its transaction type "Purchase Order" shown in brackets after the title.

In one embodiment, only the more commonly visited/accessed ongoing transactions are shown in display area 520, with the most visited/accessed transaction being shown at the top of the list. The user may click on the "More" link to view a screen (not shown) displaying the full list of ongoing transactions of interest to the user. In such an embodiment, helper tool 150 tracks the number of times a user accesses each ongoing transaction in addition to identifying the ongoing transactions in the ERP system.

It may be a readily observed that each ongoing transaction is displayed along with a respective set of data fields associated with the transaction and corresponding current values of the data fields. In particular, the data field 530 is shown associated with the purchase order transaction, while data field 535 is shown associated with the expense report transaction.

The data fields are shown along with their corresponding current values in the ERP system. In particular, the first ongoing transaction indicates that the user had initiated for a purchase order indicates that the total amount of the purchase order is "$1500 and the status is currently "Pending Approval". As the current status is available on the home screen, the user is not required to open the purchase order transaction (FIG. 3F) to see the "Status" value in display area 370.

Each ongoing transaction is also shown associated with a right arrow/chevron (560) which enables the user to drill down directly to the details of the corresponding transaction. For example, in response to the user selecting the right arrow/chevron (560) for the purchase order transaction, the user is redirected to the "Update Purchase Order" page (shown in display area 370 of FIG. 3F) where user could review the complete information pertaining to the specific purchase order and initiate any specific action on that purchase order. It should be noted that the redirecting to the specific purchase order may be implemented in any desired way such as replacing the current page with the "Update Purchase Order" page or opening the "Update Purchase Order" page in a new browser tab or opening the "Update Purchase Order" page as a modal page/layer over the current screen, as will be apparent to skilled in the relevant arts.

In addition, each ongoing transaction is also shown associated with a respective set of actions (as indicated by display area 540). A user may click/select display area 540 to view the associated set of actions.

Referring to FIG. 5B, display area 550 depicts a set of actions ("Submit", "Dismiss") associated with the ongoing expense report transaction. It should be noted that the "Dismiss" action is a default action associated with all ongoing transactions, that enables the user to indicate an ongoing transaction is no longer of interest to the user (and accordingly should not be included in display area 520 in the future).

A user may select any of the other actions shown in display area 550 (such as "Submit") to cause the selected action to be performed for the associated expense report transaction in the ERP system. As noted above, in response to the user selecting the "Submit" action in display area 550, the selected action and transaction is sent to helper tool 150, which in turn sends a corresponding transaction request to the ERP system, which causes the action selection action ("Submit") to be performed for the transaction ("expense report").

It may be appreciated that by enabling the user to view the current values of data fields and also to perform various actions associated with ongoing transactions of interest using a single user interface of FIGS. 5A/5B, the user is enabled to continue interaction with ongoing transactions of interest.

According to an aspect of the present disclosure, helper tool 150 provides the information in display area 520 based on a configuration data. The configuration data specifies a set of transaction types of interest, a corresponding set of actions associated with each transaction type, and a corresponding set of data fields associated with each transaction type. The manner in which configuration data may be maintained is described below with examples.

6. Configuration Data

Figure 6A:
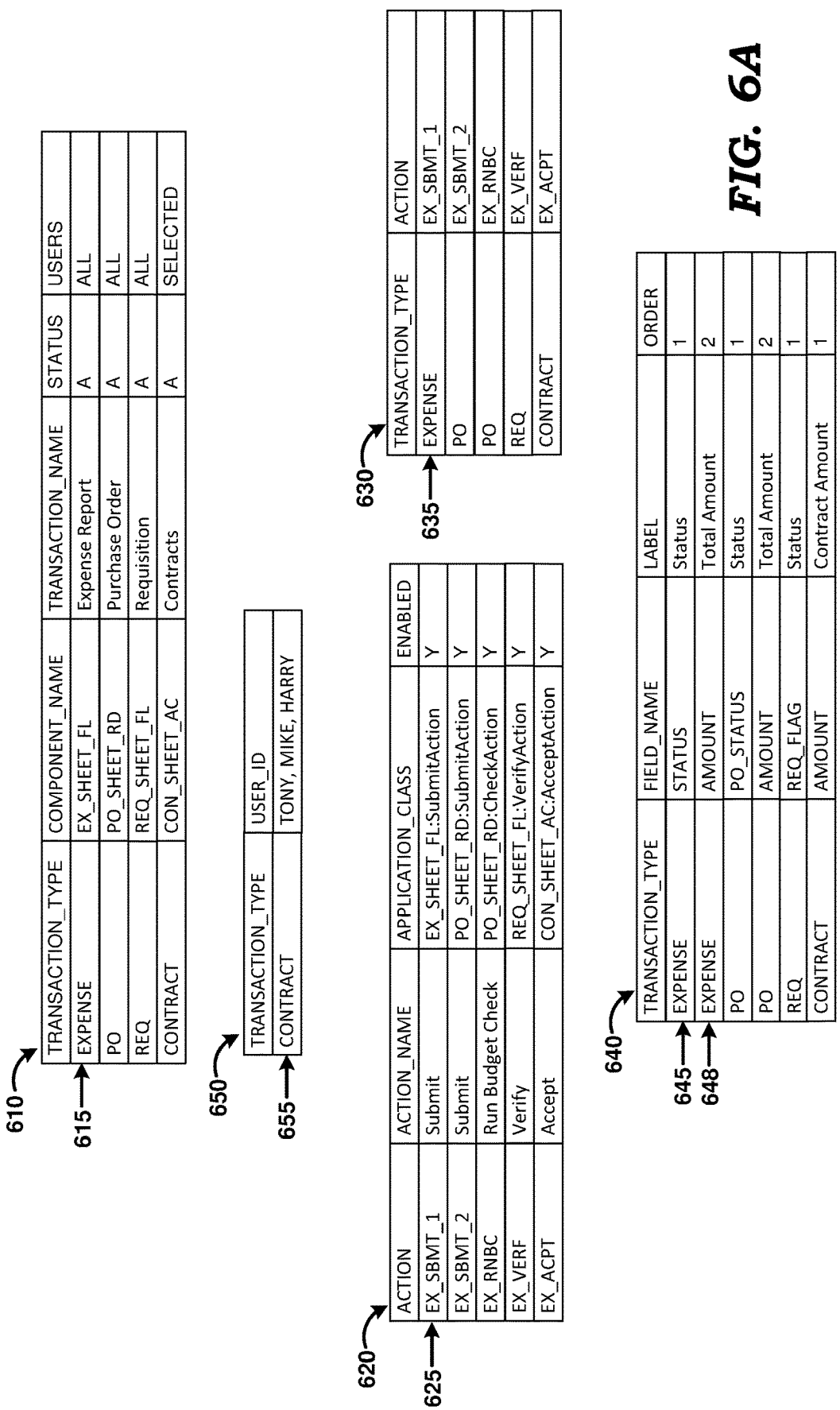
FIGS. 6A and 6B together depicts sample portions of configuration data in one embodiment.
Figure 6B:
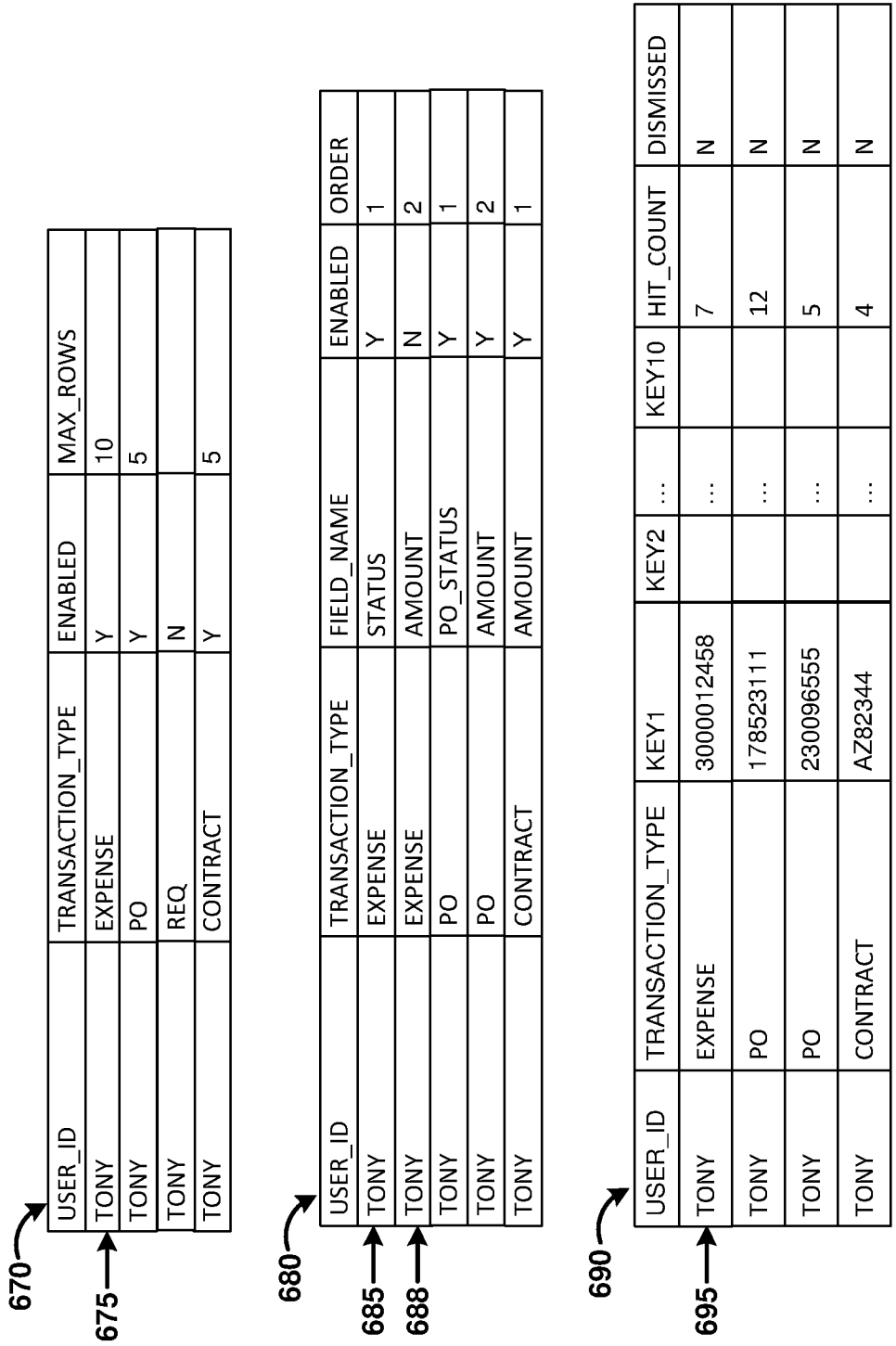

FIGS. 6A and 6B together depicts sample portions of configuration data in one embodiment. For illustration, the configuration data is shown maintained in the form of one or more tables in data store 180 (implemented as a relational database server). However, in alternative embodiments, the configuration data may be maintained according to other data formats (such as extensible markup language (XML), etc.) and/or using other data structures (such as lists, trees, etc.), as will be apparent to one skilled in the relevant arts by reading the disclosure herein.

Table 610 of FIG. 6A specifies the details of various transactions types of interest (to be monitored) and the corresponding set of users for whom the transaction type should be tracked in helper tool 150. For example, row 615 indicates that the "EXPENSE" transaction type should be tracked in helper tool 150 for "ALL" users in the system.

In case the transaction needs to be monitored only for a specific set of users (value "SELECTED" in column "USERS"), the details of all such users are captured in Table 650. Table 650 the details of various transactions types of interest (to be monitored) for each user. For example, row 655 indicates that the "EXPENSE" transaction type is of interest to the users "TONY, MIKE, HARRY". It may be readily observed that tables 610 and 650 together specify the details of four transaction types of interest.

Table 620 specifies the details of the actions configured in the ERP system, while table 630 specifies the actions associated with each transaction type. For example, row 625 indicates the details of action "Submit" configured in the ERP system, while row 635 indicates that the "Submit" action is associated with the "EXPENSE" transaction type. Similarly, the other rows specify the details of the actions associated with other transaction types.

Table 640 specifies the details of the data fields associated with each transaction type. The data fields selected here will be the subset of fields in the actual transaction. The data fields selected in table 640 determines what data should be displayed on the "Transactions of User Interest" 520 screen in FIG. 5A. For example, rows 645 and 648 indicate that the "EXPENSE" transaction type is associated with the data fields "STATUS" and "AMOUNT". Similarly, the other rows specify the details of data fields associated with other transaction types. Table 640 also specifies the corresponding labels (e.g. "Report Status") to be displayed for each of the data fields.

Thus, the configuration data specifies a set of transaction types of interest, a corresponding set of actions associated with each transaction type, and a corresponding set of data fields associated with each transaction type. The configuration data may be further personalized for each user, as described below with examples.

Table 670 specifies the transaction types and number of transactions to be included in display area 520 of FIG. 5A/5B for each user. In particular, row 675 indicates that the transaction type "EXPENSE" is to be included (value "Y" in "ENABLED" column) for the user "TONY" and the maximum number of such transactions is 10. It may be observed that the value "N" in the "ENABLED" column indicates that the corresponding transaction type is not to be included in display area 520 of FIG. 5A/5B for the user "TONY".

Though the excluded transaction types are shown indicated explicitly (by the value "N"), in alternate embodiments, such inclusion/exclusion of transaction types (and also associated actions and data fields) may be indicated by the presence/absence of a corresponding row in the table. For example, in the alternate embodiment, the absence of a row containing "REQ" and "TONY" indicates that the Requisition transaction type is excluded (not to be shown) for the user "TONY".

Table 680 specifies the specific data fields of the selected transaction types that are to be included in display area 520 for each user. In particular, rows 685 and 688 indicate that only the "STATUS" data field is to be included (value "Y" in "ENABLED" column), while the data field "AMOUNT" is not to be included (value "N" in "ENABLED" column) for the "EXPENSE" transaction type. Table 680 also specifies the order in which the data fields are to be displayed in display area 520 of FIGS. 5A/5B.

Table 690 specifies the access history for each transaction accessed by each user in the ERP system. For example, row 695 indicates that the user "TONY" has accessed the expense report transaction having the ID "3000012458" a total of 4 times (number in "HIT_COUNT" column). Table 690 also specifies whether a corresponding transaction has been dismissed (and accordingly to be no longer included in display area 520) by the user.

Thus, a user is facilitated to specify his/her transaction types of interest and the associated set of data fields of interest. The manner in which a user may provide the above configuration data is described below with examples.

7. Configuring and Personalizing

FIGS. 7A-7C depicts sample user interfaces that facilitate a user to specify configuration data in one embodiment. The various display areas shown in FIGS. 7A-7C represent a portion of a user interface displayed on a display unit (not shown) associated with one of client system 110. The user interface may be provided by helper tool 150. In one embodiment, each user interface corresponds to a web page provided by helper tool 150 and rendered by a browser executing on client system 110.

Display area 700 of FIG. 7A facilitates a user (such as an administrator of the ERP system) to configure the various transaction types of interest and the associated actions and data fields. In particular, the administrator specifies the distinct type of transaction ("Transaction Type", the technical page or component name where the transaction data is displayed ("Component Name") and the status to indicate if tracking/monitoring is active for this page ("Status"). The administrator may also specify the set of users in "User List", with "All" indicating that the tracking/monitoring will be performed for all users. In case the "User List" has the value "Selected", the administrator is facilitated to enter the individual user id's for whom the tracking needs to be enabled.

The administrator also specifies the data fields for the particular transaction type under "Data Insight Fields", and the actions that need to be enabled for the particular transactions type under "Actions List". The specific actions included in the "Actions List" may be setup using display area 730 of FIG. 7B.

Display area 730 of FIG. 7B facilitates an administrator to configure the various actions that can be performed in the ERP system. In particular, the administrator specifies a unique name for the action ("Action"), a action name as displayed to the end user ("Action Name"), a status to determine if the action is active or inactive ("Status") and a code snippet which needs to be executed in the ERP system when user selects this action ("Application Class").

Thus, an administrator is facilitated to specify various transaction types of interest and associated sets of actions and data fields. It may be noted that upon the administrator submitting the details entered in the user interfaces of FIGS. 7A and 7B, helper tool 150 stores the entered details in tables 610, 620, 630 and 640 in data store 180. An end user (not the administrator) may then personalize the transaction types to be shown for the end user.

Display area 750 of FIG. 7C depicts a personalization page that further allows each end user to decide what information he/she can see as a refinement to the configuration defined by the administrator. In particular, the end user may change the Enable Flag from Yes/No to decide if s/he wants to track/monitor a transaction of that type. The list of transaction types is populated based on the transaction types enabled by the administrator for this end user.

For every transaction type made available to the user, the user will see a corresponding collapsible option labeled "Configure <Transaction Type>". Upon expanding the option, a list the data fields made available by the administrator is displayed to the end user. Within this list, the user can decide which data fields needs to be made visible in display area 520 (by selecting enable field). The user can also change the order in which data fields needs to be displayed and can decide if the label for that field needs to be displayed.

Thus, a user is facilitated to specify various transaction types of interest only to the user and associated sets of actions and data fields. It may be noted that upon the user submitting the details entered in the user interface of FIG. 7C, helper tool 150 stores the entered details in tables 660, 670 and 680 in data store 180.

It should be further appreciated that the features described above can be implemented in various embodiments as a desired combination of one or more of hardware, software, and firmware. The description is continued with respect to an embodiment in which various features are operative when the software instructions described above are executed.

8. Digital Processing System

Figure 8:
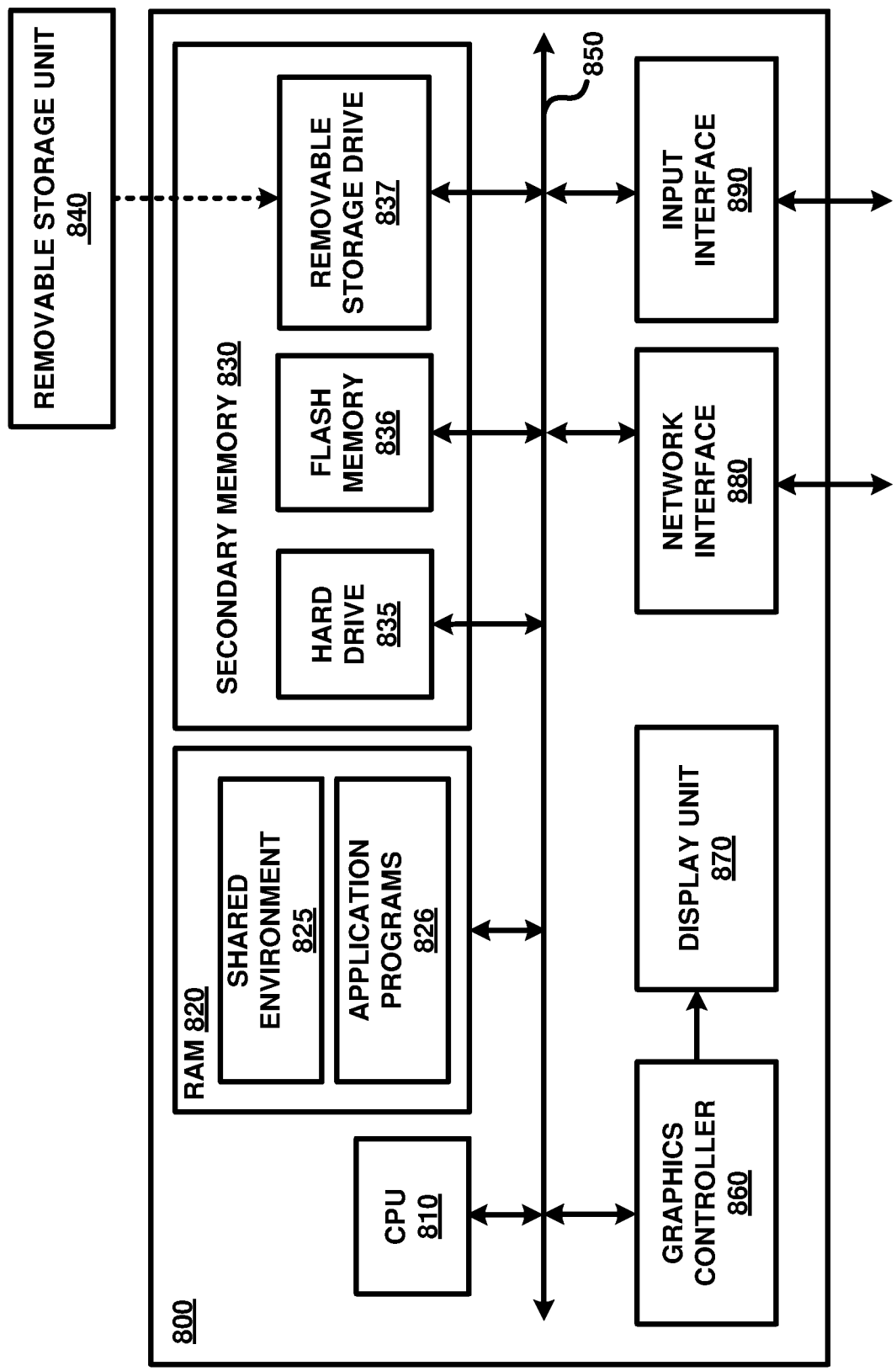
FIG. 8 is a block diagram illustrating the details of a digital processing system in which various aspects of the present disclosure are operative by execution of appropriate executable modules.

FIG. 8 is a block diagram illustrating the details of digital processing system 800 in which various aspects of the present disclosure are operative by execution of appropriate executable modules. Digital processing system 800 may correspond to one of client system 110, enterprise server 145 or a system implementing helper tool 150.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or other user programs 826 (such as other applications, DBMS, etc.). In addition to shared environment 825, RAM 820 may contain other software programs such as device drivers, virtual machines, etc., which provide a (common) run time environment for execution of other/user programs.

Graphics controller 860 generates display signals (e.g., in RGB format) to display unit 870 based on data/instructions received from CPU 810. Display unit 870 contains a display screen to display the images defined by the display signals (for example, the portions of the user interfaces shown in FIGS. 3A-3F, 4A-4D, 5A-5B and 7A-7C). Input interface 890 may correspond to a keyboard and a pointing device (e.g., touch-pad, mouse) and may be used to provide inputs (for example, the inputs associated with the user interfaces shown in FIGS. 3A-3F, 4A-4D, 5A-5B and 7A-7C). Network interface 880 provides connectivity to a network (e.g., using Internet Protocol), and may be used to communicate with other systems (of FIG. 1) connected to the networks (120).

Secondary memory 830 may contain hard drive 835, flash memory 836, and removable storage drive 837. Secondary memory 830 may store the data (for example, data portions shown in FIGS. 6A and 6B) and software instructions (for example, for implementing the various features of the present disclosure as shown in FIG. 2, etc.), which enable digital processing system 800 to provide several features in accordance with the present disclosure. The code/instructions stored in secondary memory 830 may either be copied to RAM 820 prior to execution by CPU 810 for higher execution speeds, or may be directly executed by CPU 810.

Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:
1. A method of continuing interaction with an enterprise resource planning (ERP) system comprising one or more ERP servers, each ERP server comprising a processor and a memory, the method comprising:
   maintaining in a data store, a configuration data specifying a respective set of actions associated with each transaction type of a set of transaction types;

monitoring actions performed by each user in said one or more ERP servers to identify actions performed by each user for the transactions of respective transaction types;

storing in a non-volatile storage, based on said monitoring, an access history indicative of past actions performed by each user for corresponding transactions;

receiving, from a client system of a first user, at a first time instance, a request for ongoing transactions of interest;

identifying in said one or more ERP servers, based on said access history and said configuration data, a plurality of ongoing transactions for said first user, wherein a transaction of a transaction type is identified as an ongoing transaction for said first user if said access history indicates at least one past action of said respective set of actions for the transaction type has been performed by said first user prior to said first time instance and if said configuration data indicates that there is a corresponding set of future actions of said respective set of actions for the transaction type that are to be performed by said first user after said first time instance for said transaction to be deemed to be completed;

sending for display on a user interface provided using a display unit of said client system, said plurality of ongoing transactions in said one or more ERP servers and said corresponding set of future actions associated with each ongoing transaction of said plurality of ongoing transactions;

receiving from said user interface of said client system, data indicating selection of a first action associated with a first ongoing transaction of said plurality of ongoing transactions, wherein said first user selects said first action from said corresponding set of future actions of said first ongoing transaction displayed on said user interface provided on said display unit to said first user; and performing in said one or more ERP servers, said first action for said first ongoing transaction in response to said receiving, wherein, upon said performing, said monitoring identifies said first action also as having been performed by said first user for said first ongoing transaction.

2. The method of claim 1, wherein prior to said first time instance, said one or more ERP servers provides said first user an option to navigate a set of screens corresponding to said first ongoing transaction to view a first screen from which said first action is enabled to be performed, wherein said first action is performed in said one or more ERP servers, in response to said selection without said first user having to navigate said set of screens.

3. The method of claim 1, further comprising:

including in said plurality of ongoing transactions, only those ongoing transactions of said set of transaction types initiated by said first user, in response to said configuration data.

4. The method of claim 3, wherein said sending also sends for display a respective set of data fields and corresponding values associated with each ongoing transaction, wherein said first user performs said selection after viewing values of a first set of data fields associated with said first ongoing transaction.

5. The method of claim 4, wherein said configuration data further specifies a corresponding set of data fields associated with each transaction type of said set of transaction types, wherein said respective set of data fields are selected based on said configuration data.

6. The method of claim 5, wherein each action performed by said first user with respect to a transaction provides a corresponding value for a data field associated with a transaction type of said transaction, wherein said access history stores the corresponding value as current value for the data field to indicate that said action has been performed by said first user, wherein said sending sends the current values of said respective sets of data fields at said first time instance.

7. A digital processing system implementing one or more enterprise resource planning (ERP) servers of a ERP system, said digital processing system comprising:

a random access memory (RAM) to store instructions; and one or more processors to retrieve and execute said instructions, wherein execution of said instructions causes said digital processing system to perform the actions of:

maintaining in a data store, a configuration data specifying for each user, transaction types of interest for each user, and a respective set of actions and respective set of data fields associated with each transaction type of a set of transaction types;

monitoring actions performed by each user in said one or more ERP servers to identify actions performed by each user for the transactions of respective transaction types;

storing in a non-volatile storage, based on said monitoring, an access history indicative of past actions performed by each user for corresponding transactions;

receiving, from a client system of a first user, at a first time instance, a request for ongoing transactions of interest;

identifying in said one or more ERP servers, based on said access history and said configuration data, a plurality of ongoing transactions for said first user, wherein a transaction of a transaction type is identified as an ongoing transaction for said first user if said access history indicates at least one past action of said respective set of actions for the transaction type has been performed by said first user prior to said first time instance and if said configuration data indicates that there is a corresponding set of future actions of said respective set of actions for the transaction type that are to be performed by said first user after said first time instance for said transaction to be deemed to be completed;

sending for display on a user interface provided using a display unit of said client system, said plurality of ongoing transactions containing the identified ongoing transactions of the transaction types of interest to said first user, said corresponding set of future actions, said respective set of data fields and corresponding current values for said respective set of data fields associated with each ongoing transaction of said plurality of ongoing transactions;

receiving from said user interface of said client system, data indicating selection of a first action associated with a first ongoing transaction of said plurality of ongoing transactions, wherein said first user selects said first action from said corresponding set of future actions of said first ongoing transaction displayed on said user interface provided on said display unit to said first user; and performing in said one or more ERP servers, said first action for said first ongoing transaction in response to said receiving, wherein, upon said performing, said monitoring identifies said first action also as having been performed by said first user for said first ongoing transaction.

8. The digital processing system of claim 7, wherein prior to said first time instance, said one or more ERP servers provides said first user an option to navigate a set of screens corresponding to said first ongoing transaction to view a first screen from which said first action is enabled to be performed, wherein said current values are displayed and said first action is performed in said one or more ERP servers, in response to said selection without said first user having to navigate said set of screens.

9. The digital processing system of claim 8, wherein said digital processing system includes in said plurality of ongoing transactions, transactions of said set of transaction types initiated by said first user, in response to said configuration data.

10. The digital processing system of claim 9, wherein said respective set of actions and said respective set of data fields associated with each ongoing transaction is based on said configuration data.

11. The digital processing system of claim 10, wherein said sending sends the current values of said respective sets of data fields at said first time instance.

12. The digital processing system of claim 7, wherein for said maintaining, said digital processing system further performs the actions of:

receiving from an administrator, a plurality of transaction types, a respective set of actions and respective plurality of data fields associated with each transaction type;

enabling said first user to select a set of transaction types of interest from said plurality of transaction types and a respective set of data fields associated with each transaction type of interest; and storing said selected set of transaction types of interest, said respective set of actions and said respective set of data fields associated with each transaction type of interest as being specified for said first user in said configuration data.

13. A non-transitory machine readable medium storing one or more sequences of instructions for continuing interaction with ongoing transactions in an enterprise resource planning (ERP) system comprising one or more ERP servers, wherein execution of said one or more instructions by one or more processors contained in said one or more ERP servers causes said one or more ERP servers to perform the actions of:

maintaining in a data store, a configuration data specifying a respective set of actions associated with each transaction type of a set of transaction types;

monitoring actions performed by each user in said one or more ERP servers to identify actions performed by each user for the transactions of respective transaction types;

storing in a non-volatile storage, based on said monitoring, an access history indicative of past actions performed by each user for corresponding transactions;

receiving, from a client system of a first user, at a first time instance, a request for ongoing transactions of interest;

identifying in said one or more ERP servers, based on said access history and said configuration data, a plurality of ongoing transactions for said first user, wherein a transaction of a transaction type is identified as an ongoing transaction for said first user if said access history indicates at least one past action of said respective set of actions for the transaction type has been performed by said first user prior to said first time instance and if said configuration data indicates that there is a corresponding set of future actions of said respective set of actions for the transaction type that are to be performed by said first user after said first time instance for said transaction to be deemed to be completed;

sending for display on a user interface provided using a display unit of said client system, said plurality of ongoing transactions in said one or more ERP servers and said corresponding set of future actions associated with each ongoing transaction of said plurality of ongoing transactions;

receiving from said user interface of said client system, data indicating selection of a first action associated with a first ongoing transaction of said plurality of ongoing transactions, wherein said first user selects said first action from said corresponding set of future actions of said first ongoing transaction displayed on said user interface provided on said display unit to said first user; and performing in said one or more ERP servers, said first action for said first ongoing transaction in response to said receiving, wherein, upon said performing, said monitoring identifies said first action also as having been performed by said first user for said first ongoing transaction.

14. The non-transitory machine readable medium of claim 13, wherein prior to said first time instance, said one or more ERP servers provides said first user an option to navigate a set of screens corresponding to said first ongoing transaction to view a first screen from which said first action is enabled to be performed, wherein said first action is performed in said one or more ERP servers, in response to said selection without said first user having to navigate said set of screens.

15. The non-transitory machine readable medium of claim 13, further comprising:

including in said plurality of ongoing transactions, only those ongoing transactions of said set of transaction types initiated by said first user, in response to said configuration data.

16. The non-transitory machine readable medium of claim 15, wherein said sending also sends for display a respective set of data fields and corresponding values associated with each ongoing transaction, wherein said first user performs said selection after viewing values of a first set of data fields associated with said first ongoing transaction.

17. The non-transitory machine readable medium of claim 16, wherein said configuration data further specifies a corresponding set of data fields associated with each transaction type of said set of transaction types, wherein said respective set of data fields are selected based on said configuration data.

18. The non-transitory machine readable medium of claim 17, wherein each action performed by said first user with respect to a transaction provides a corresponding value for a data field associated with a transaction type of said transaction, wherein said access history stores the corresponding value as current value for the data field to indicate that said action has been performed by said first user, wherein said sending sends the current values of said respective sets of data fields at said first time instance.

* * * * *

UNITED STATES PATENT AND TRADEMARK OFFICE
CERTIFICATE OF CORRECTION

PATENT NO. : 11,514,380 B2
APPLICATION NO. : 16/525634
DATED : November 29, 2022
INVENTOR(S) : Tony P Thomas It is certified that error appears in the above-identified patent and that said Letters Patent is hereby corrected as shown below:

On the Title Page

Column 2, under Other Publications, Line 1, delete "Peiermoxon," and insert -- Petermoxon, --, therefor.

In the Drawings

On sheet 7 of 17, in FIG. 3F, Line 14, delete "Aummary" and insert -- Summary --, therefor.

In the Specification

In Column 9, Line 30, delete ""$1500" and insert -- "$1500" --, therefor.

In Column 11, Line 8, delete "FIG." and insert -- FIGS. --, therefor.

In Column 11, Line 15, delete "FIG." and insert -- FIGS. --, therefor.

In Column 11, Line 62, delete "Type"" and insert -- "Type")" --, therefor.

Signed and Sealed this
Fifteenth Day of August, 2023

Katherine Kelly Vidal
*Director of the United States Patent and Trademark Office*